Dec. 19, 1950 L. A. BARNETT 2,534,216
COMPUTING LEVEL
Filed Sept. 23, 1947 2 Sheets-Sheet 1
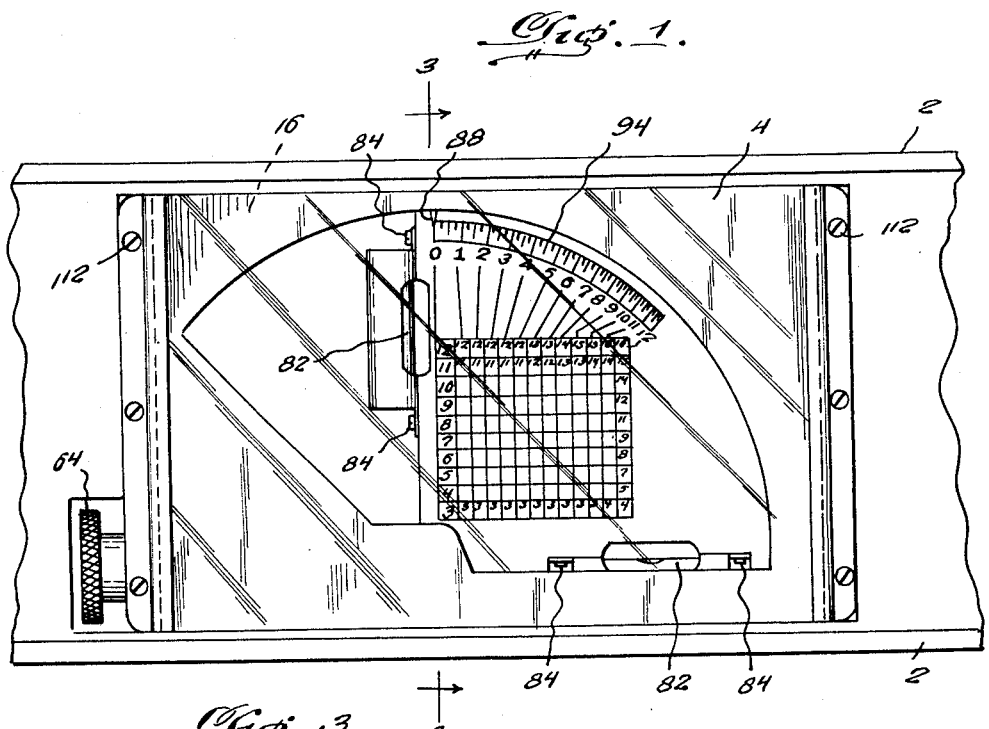
Fig. 1.
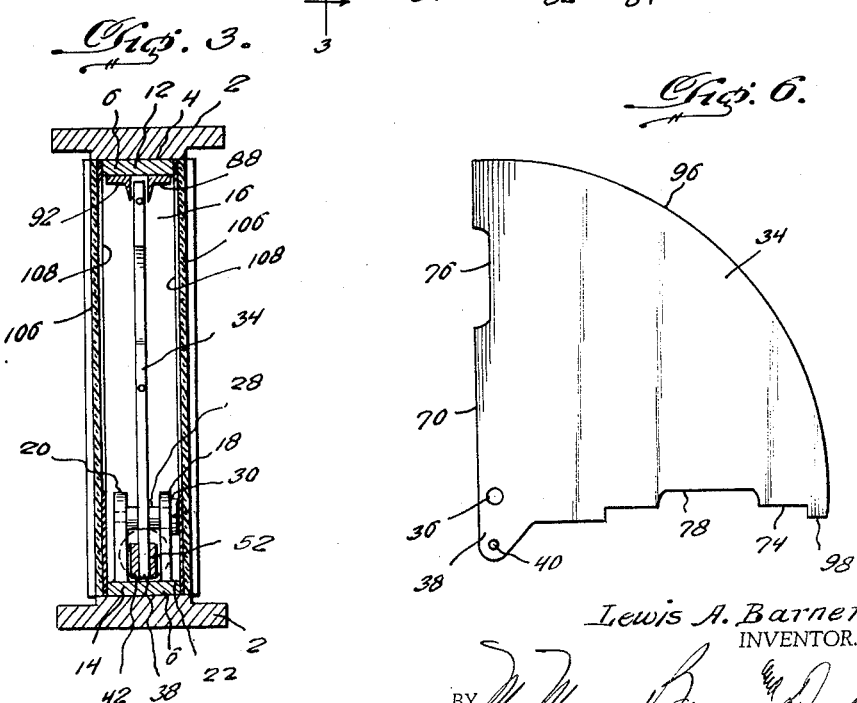
Fig. 3.
Fig. 6.
Lewis A. Barnett,
INVENTOR.
BY
Attorneys

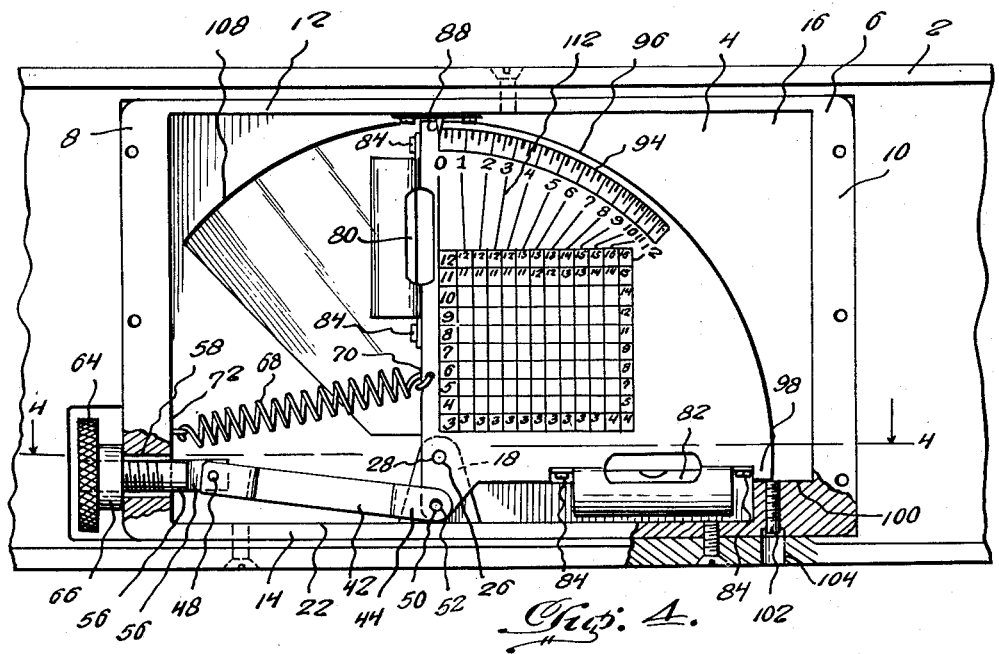
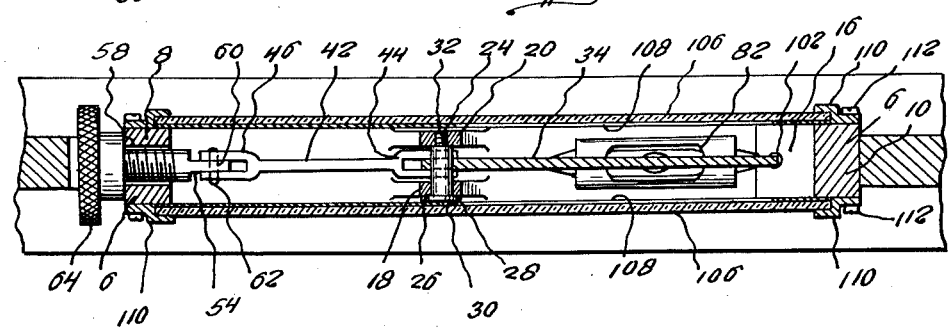
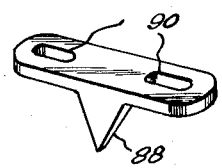

Patented Dec. 19, 1950

2,534,216

UNITED STATES PATENT OFFICE 2,534,216

COMPUTING LEVEL

Lewis A. Barnett, Asheville, N. C.

Application September 23, 1947, Serial No. 775,571

2 Claims. (Cl. 33—214)

This invention relates to the measurement and registering of elevations and angles.

An object of the invention is to produce a level for measuring elevations and angles of inclination of objects or portions thereof.

Another object of the invention is to produce a computing level which shall be adjustable to any elevation or angle from zero to ninety degrees.

A further object of the invention is to provide a computing level having spirit level glasses of the usual type, which will register both level and plumb in the usual manner.

Another object of the invention is to produce a computing level having novel features of construction by means of which it is capable of being mounted in a level stock for ready and convenient use whenever required.

Another object of the invention is to provide an instrument or level in which the spirit levels are disposed on a movable support with an angle of ninety degrees between the levels, with manual means for moving the support angularly on a frame to some elevation or angle other than level or plumb and for returning the support to initial position or to some other desired angular position.

Another object of the invention is to provide a registering computing level having moving parts and carrying a table of figures and indicators which co-act with a pointer on the frame whereby the use to be made of the registered angle may be determined from the table of figures which correlate the conjunction of the pointer with the indicators.

A further object of the invention is to provide a novel and improved means and construction for easily and accurately adjusting and manipulating the moving parts of the instrument during use thereof.

Other objects and advantages of the invention will become apparent from the following description of a preferred embodiment of my invention as illustrated in the accompanying drawings, and in which:

Figure 1 is a front elevation of my improved level computing level installed in position in a level stock or the like and ready for use, the stock being shown in fragment.

Figure 2 is an elevational view of the level shown in Figure 1, but with the outer cover plate and protecting glass plate removed to expose the operating mechanism to view, the view being partly sectioned for further clarity.

Figure 3 is a transverse sectional view taken on line 3—3 of Figure 1.

Figure 4 is a horizontal sectional view taken on line 4—4 of Figure 2.

Figure 5 is a detail perspective view of the pointer, and

Figure 6 is a face detail view of the movable disk.

Referring now to the drawings, a level stock 2 is provided at some position along its length, preferably in the center, with a cut-out lateral aperture 4 extending entirely through the stock from its front to rear face. Within this cut-out portion 4, which as illustrated is substantially rectangular in cross section, is positioned a computing level support frame 6 having left and right side members 8 and 10 as seen in Figure 2, and top and bottom members 12 and 14, the frame 6 being preferably molded in one integral piece of metal or other suitable material, for strength and rigidity. It is thus noted that the top, bottom and sides of the frame form a substantially rectangular chamber 16 therein, within which mechanism is positioned as described below.

As best seen in Figures 2 and 3, a pair of upstanding bearing members 18 and 20 are supported on or molded integral with the upper surface 22 of bottom member 14 of the frame 6, the members 18 and 20 being spaced from and parallel to each other as shown, and having axially aligned bores 24 and 26 for the reception of a pivot pin 28 having a slotted head 30 and having its end 32 threaded into bore 24. As illustrated, the shank of the pivot pin 28 is slightly greater in diameter than the threaded end portion 32 of the pin, so that bore 26 is unthreaded and slightly greater in diameter than bore 24.

The disk 34, which as shown is roughly in the shape of a quadrant of a circle, with an aperture 36 substantially at the intersection of the sides of the quadrant, is journaled between bearing members 18 and 20 with pivot pin 28 extending through aperture 36 and pivotally supporting the disk. As best seen in Figures 2 and 6, the disk 34 has a downward extension 38 with a transverse aperture 40 near the lower end thereof, the extension 38 forming, as will be further explained, a crank arm for exerting force for pivoting the disk about pivot pin 28.

A connecting rod 42 has bifurcated end portions 44 and 46 having aligned transverse holes 48 and 50 in the bifurcations. The apertured lower end of extension 38 extends between the bifurcations of end portion 44 of the connecting rod 42, with the holes 50 in axial alignment with aperture 40 in the disk, a pivot pin 52 extending through the aligned holes 40 and 50 and having the ends of the pin 52 peined or otherwise treated to retain it in place, with extension 38 of the disk thus pivotally mounted on the pivot 52.

The other bifurcated end portion 46 of the connecting rod 42 is similarly pivotally connected to one end 54 of the disk position adjusting shaft 56 which extends through a lateral bore 58 in left side member 8 of the frame 6, the end 54 of the shaft having an aperture 60 through which and the aligned holes 48 in the connecting rod, a pivot pin 62 extends.

Position adjusting shaft 56 has its cylindrical middle and left end portions as seen in Figures 2 and 4, threaded into engagement with a knurled disc position adjusting knob 64 having a matching threaded bore 66.

A tension spring 68 has one end engaging the edge 70 of the disk and the other end engaging the edge 72 of frame side member 8, thus serving to bias the disk counter-clockwise on pivot 28 against the clockwise pull of disk position adjusting shaft 56. Accordingly, the disk may be rotated about pivot 28 by merely turning adjusting knob 64, the direction of its rotation being determined by the direction of rotation of knob 64, the spring 68 operating to take up any slack, the disk being hence held in any position, turning out of said position only when knob 64 is turned.

The edges 70 and 74 of the disk are cut out at 76 and 78 respectively to provide visibility from both faces of the level stock of the spirit level glasses 80 and 82 which are secured to these edges by screws 84 as shown. An indexing pointer 88 is fastened to the lower surface of top member 12 of the frame 6 by means of screws extending through elongated apertures 90 in the pointer 88, the apertures being elongated as shown, to permit adjustment of the position of the pointer. A second pointer 92, identical in construction to pointer 88, is similarly secured to the lower surface of top member 12, but on the opposite side of the edge of disk 34, as best seen in Figure 3, so that a pointer is available and visible when either side of the disk is used.

Graduations 94 are provided along and slightly spaced from the curved edge 96, so that the exact position of the pointer may be determined by inspection of the corresponding graduations. The disk 34 has a lug 98 on one edge to bear against a ledge 100 formed in a corner of frame 6 when near the zero pointer graduation, a screw 102 being threaded into a bore in the ledge for adjusting the zero position of the disk, the slotted head of the screw 102 being accessible from the outside of the level stock through a hole 104 in the stock.

Each face of the device is provided with a substantially rectangular transparent cover plate 106 of glass or other suitable material, sheet 108 of thick black paper or other material being placed between each glass cover plate and the frame 6 to protect and cushion the glass, the paper being cut out to allow the scales of the disk and the pointers and the spirit levels to be seen through the glass. Fastening strips 110, of metal or other material, and having holes along their edges, hold the glass cover plates 106 and paper sheets 108 in place, being secured to the frame 6 by screws 112 threaded into matching holes in the frame.

The graduated scale 94 is preferably placed on both faces of the disk 34 so as to allow readings to be taken from either side, and also to allow, if desired, the front face of the scale as seen in Figures 1 and 2 to be used for angles from zero to 45 degrees, and the rear face of the scale to be used for angles from 45 to 90 degrees. As illustrated, the scales and graduations find particular utility in connection with framing. In use, the level is placed in position against the part whose angle of inclination is to be measured, and the adjusting knob 64 turned until either of the spirit levels shows level, the position of pointer 88 relative to the scale of graduations 94 then giving the exact elevation in twelve inches or the exact feet in twelve feet. For example, if the bead in the level glass is in the center of the glass, and the figure one on scale 94 is directly under pointer 88, then the elevation is one inch in twelve inches or three degrees and forty-five minutes from zero. The square table on the dial of disk 34 may, with indicating lines 112 leading from the graduations to the square table, be employed to show the length of rafter for a building with the comb of the roof in the center of the building, the spaces in the table being properly filled in. The graduations, table and indicating lines are merely illustrative, inasmuch as other types of data and tables may be disposed on the opposite faces of the dial of disk 34.

Although the invention has been described in specific terms, it is to be understood that various changes may be made in size, shape, materials and arrangement without departing from the scope and spirit of the invention.

I claim:

1. In a computing level comprising a frame normally disposed in a vertical plane, a segmental plate pivoted at the apex thereof to be movable in a vertical plane about the pivotal mounting thereof, a stationary pointer upon the frame in effective position to have the arcuate edge of the segmental plate at all times disposed in reference position thereto, and graduations located along said arcuate edge on said plate beneath said pointer, the improvements which include having the frame substantially rectangular and open with end frame members and horizontal top and bottom frame members with the pointer attached to the top frame member and the pivotal mounting of the segmental plate disposed upon the bottom frame member, having the segmental plate quadrant shaped with two bubble levels fixed at the two radial edges of said segmental plate at right angles to each other, the pivotal mounting of the quadrant shaped segmental plate allowing it to be partly rotated upon said pivotal mounting from a zero position in which one radial edge is substantially parallel with the bottom frame member to another position in which the other radial edge is disposed at less than a right angle to said bottom frame member, an integral extension or lug depending from the apex portion of said segmental plate in alignment with one radial edge of the latter, an endwise adjustable screw extending rotatably through one end frame member with a rotatable nut screwed on the outer end exteriorly of said one end frame member and having an apertured lug upon the inner end within the latter end frame member, and a link above the bottom frame member which is bifurcated at both ends and pivotally connected at one bifurcated end to said integral extension or lug upon said segmental plate and at the other bifurcated end pivotally connected to the apertured lug on the inner end of said screw.

2. In a computing level comprising a frame normally disposed in a vertical plane, a segmental plate pivoted at the apex thereof to be movable in a vertical plane about the pivotal mounting thereof, a stationary pointer upon the frame in effective position to have the arcuate edge of the segmental plate at all times disposed in reference position thereto, and graduations located along said arcuate edge on said plate beneath said pointer, the improvements which include having the frame substantially rectangular and open with end frame members and horizontal top and bottom frame members with the pointer attached to the top frame member and the pivotal mounting of the segmental plate disposed upon the bottom frame member, having the segmental plate quadrant shaped with two bubble levels fixed at the two radial edges of said segmental plate at right angles to each other, the pivotal mounting of the quadrant shaped segmental plate allowing it to be partly rotated upon said pivotal mounting from a zero position in which one radial edge is substantially parallel with the bottom frame member to another position in which the other radial edge is disposed at less than a right angle to said bottom frame member, an integral extension or lug depending from the apex portion of said segmental plate in alignment with one radial edge of the latter, an endwise adjustable screw extending rotatably through one end frame member with a rotatable nut screwed on the outer end exteriorly of said one end frame member and having an apertured lug upon the inner end within the latter end frame member, a link above the bottom frame member which is bifurcated at both ends and pivotally connected at one bifurcated end to said integral extension or lug upon said segmental plate and at the other bifurcated end pivotally connected to the apertured lug on the inner end of said screw, and a tension spring above said link connected at one end to said one end frame member and to the segmental plate at the other end thereof adjacent the radial edge of said plate with which said extension or lug is aligned.

LEWIS A. BARNETT.

REFERENCES CITED

The following references are of record in the file of this patent:

UNITED STATES PATENTS

| Number | Name | Date |
| --- | --- | --- |
| 778,867 | Kern, Jr. | Jan. 3, 1905 |
| 931,769 | Knoll | Aug. 24, 1909 |
| 1,114,480 | Jensen | Oct. 20, 1914 |
| 1,555,254 | Proctor | Sept. 29, 1925 |
| 1,914,081 | Crisp | June 13, 1933 |
| 2,358,010 | Holmes | Sept. 12, 1944 |
| 2,423,317 | Holton | July 1, 1947 |

FOREIGN PATENTS

| Number | Country | Date |
| --- | --- | --- |
| 5,412 | Great Britain | 1912 |